(12) United States Patent
Alexander et al.

(10) Patent No.: US 9,246,912 B2
(45) Date of Patent: Jan. 26, 2016

(54) PASSWORD GENERATOR

(71) Applicant: Bank of America Corporation, Charlotte, NC (US)

(72) Inventors: Denise Alexander, Fort Mills, SC (US); Sugumar Balaraman, Jacksonville, FL (US); Thiyagu Chandran, Tamil Nadu (IN); Prabhu Davidraj, Charlotte, NC (US); Judeson Bobson John, Tamil Nadu (IN); Mary E. Merrill, Lake Wylie, SC (US); Meenakshi Sundaram Natarajan, Jacksonville, FL (US); Senthil Thiyagarajan, Charlotte, NC (US); Jerome Zott, Glastonbury, CT (US)

(73) Assignee: Bank of America Corporation, Charlotte, NC (US)

( * ) Notice: Subject to any disclaimer, the term of this patent is extended or adjusted under 35 U.S.C. 154(b) by 35 days.

(21) Appl. No.: 14/242,189

(22) Filed: Apr. 1, 2014

(65) Prior Publication Data
US 2015/0281223 A1 Oct. 1, 2015

(51) Int. Cl.
| | |
|---|---|
| G06F 7/04 | (2006.01) |
| G06F 15/16 | (2006.01) |
| G06F 17/30 | (2006.01) |
| H04L 29/06 | (2006.01) |
| G06F 21/00 | (2013.01) |

(52) U.S. Cl.
CPC ............ *H04L 63/0846* (2013.01); *G06F 21/00* (2013.01); *G06F 17/30592* (2013.01)

(58) Field of Classification Search
CPC . H04L 63/083; H04L 9/3226; H04L 63/0846; G06F 17/30592
See application file for complete search history.

(56) References Cited

U.S. PATENT DOCUMENTS

| | | | | |
|---|---|---|---|---|
| 5,734,718 | A * | 3/1998 | Prafullchandra | 713/183 |
| 5,793,952 | A * | 8/1998 | Limsico | 726/18 |
| 2010/0293600 | A1 * | 11/2010 | Schechter et al. | 726/4 |
| 2012/0311322 | A1 * | 12/2012 | Koyun et al. | 713/156 |

* cited by examiner

*Primary Examiner* — David García Cervetti
*Assistant Examiner* — Amie C Lin
(74) *Attorney, Agent, or Firm* — Banner & Witcoff, Ltd.; Michael A. Springs

(57) ABSTRACT

Methods and apparatus are disclosed for generating a short term password that may be used to access a data warehouse. According to aspects of the disclosure, a user may request a password after inputting a data warehouse environment, an ID name, and a reason for the password reset. A server may receive the request and determine whether the difference in time of the present request and a previous request for the same ID name and data warehouse environment is greater than a time limit. Additionally, the server may determine whether a previous user has logged in using a password for the same ID name and data warehouse environment. Thereafter, the server may generate and output a short term password that expires after the time limit.

20 Claims, 3 Drawing Sheets

PASSWORD GENERATOR

TECHNICAL FIELD

Aspects of the disclosure relate generally to a system and method for generating a short term ad hoc password. Specifically, aspects of the disclosure relate to a password generator that enables an authorized user to obtain a single use short term password for a generic user ID.

BACKGROUND

Data warehouse users, such as production support team members, often utilize generic user ID's to obtain access to a data warehouse. The production support team may perform various tasks at the data warehouse, such as testing, maintenance, and break-fix tasks. In order to sign on to the data warehouse, the user will need the generic user ID along with a password. Since generic user ID's are used by multiple support teams, it is often necessary to store the password in clear text at a secure location. This location may include a particular internal website, file, or at an offsite location. However, even attempts to store passwords at a secure location are not effective as the password is shared and known by many users.

As more users become aware of a single password, the likelihood of the password becoming compromised increases. The use of a single hard coded password often leads to poor password management procedures and enables users to store or copy the password to insecure locations or share with unauthorized individuals. Moreover, even certain safeguards, such as requiring a password reset on a 30-90 day schedule still leads to password compromise as users often reset the password to a predictable or easy-to-guess value. Such password compromise could lead to accidental or malicious modification or disclosure of confidential information. Furthermore, it is almost impossible to determine the extent of password dissemination amongst unauthorized users.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Certain aspects disclose a method, comprising: receiving, at a processor, a request to generate a password, wherein the request comprises a data warehouse environment, an ID name, and a reason for password reset; determining, at the processor, the time that the request to generate a password is received at the processor; identifying, at the processor, the latest previous request to generate a password initiated for the ID name and the data warehouse environment, wherein the identifying comprises determining the time that the latest previous request was received at the processor; calculating, at the processor, a time difference between the time the request to generate a password is received at the processor and the time the latest previous request to generate a password was received at the processor; comparing, at the processor, the time difference with a time limit, wherein the processor outputs a denial message when the time difference is less than the time limit; generating, at the processor, a password when the time difference is greater than the time limit; and outputting, at the processor, the password after generating the password.

Certain other aspects disclose a non-transitory computer-readable storage medium having computer-executable program instructions stored thereon that, when executed by a processor, cause the processor to: receive a request to generate a password, wherein the request comprises a data warehouse environment, an ID name, and a reason for password reset; determine the time that the request to generate a password is received at the processor; identify the latest previous request to generate a password initiated for the ID name and the data warehouse environment, wherein the identifying comprises determining the time that the latest previous request was received at the processor; calculate a time difference between the time the request to generate a password is received at the processor and the time the latest previous request to generate a password was received at the processor; compare the time difference with a time limit, wherein the processor outputs a denial message when the time difference is less than the time limit; generate a password when the time difference is greater than the time limit; and output the password after generating the password.

Certain other aspects disclose an apparatus comprising: a memory; a processor, wherein the processor executes computer-executable program instructions which cause the processor to: receive a request to generate a password, wherein the request comprises a data warehouse environment, an ID name, and a reason for password reset; determine the time that the request to generate a password is received at the processor; identify the latest previous request to generate a password initiated for the ID name and the data warehouse environment, wherein the identifying comprises determining the time that the latest previous request was received at the processor; calculate a time difference between the time the request to generate a password is received at the processor and the time the latest previous request to generate a password was received at the processor; compare the time difference with a time limit, wherein the processor outputs a denial message when the time difference is less than the time limit; generate a password when the time difference is greater than the time limit; and output the password after generating the password.

The details of these and other embodiments of the disclosure are set forth in the accompanying drawings and description below. Other features and advantages of aspects of the disclosure will be apparent from the description, drawings, and claims.

BRIEF DESCRIPTION OF THE DRAWINGS

All descriptions are exemplary and explanatory only and are not intended to restrict the disclosure, as claimed. The accompanying drawings, which are incorporated in and constitute a part of this specification, illustrate embodiments of the disclosure and, together with the description, serve to explain principles of the disclosure. In the drawings:

DETAILED DESCRIPTION

In accordance with various aspects of the disclosure, methods, non-transitory computer-readable media, and apparatuses are disclosed for monitoring and outputting server inventory trends. In certain aspects, when a server receives a request data from a computing device, the server processes and analyzes the request and provides the requested data. The automated process may utilize various hardware components (e.g., processors, communication servers, memory devices, and the like) and related computer algorithms to generate image data related to the agency's business data.

Figure 1:
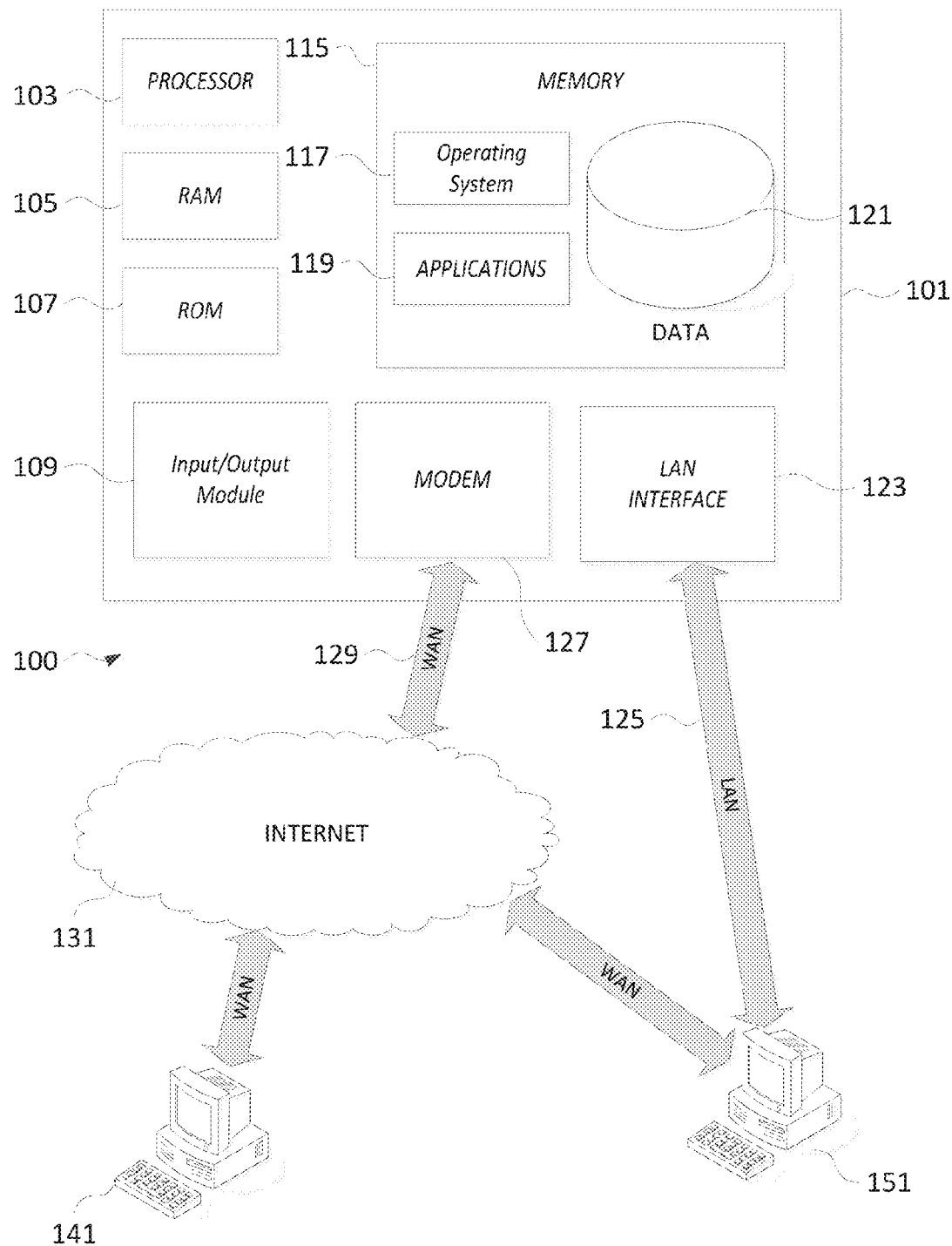
FIG. 1 shows an illustrative operating environment in which various aspects of the disclosure may be implemented.

FIG. 1 illustrates an example of a suitable computing system environment 100 that may be used according to one or more illustrative embodiments. The computing system environment 100 is only one example of a suitable computing environment and is not intended to suggest any limitation as to the scope of use or functionality contained in the disclosure. The computing system environment 100 should not be interpreted as having any dependency or requirement relating to any one or combination of components shown in the illustrative computing system environment 100.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

With reference to FIG. 1, the computing system environment 100 may include an enhanced computing server 101 wherein the processes discussed herein may be implemented. The enhanced computing server 101 may have a processor 103 for controlling the overall operation of the enhanced computing server 101 and its associated components, including random-access memory (RAM) 105, read-only memory (ROM) 107, communications module 109, and memory 115. Processor 103 and its associated components may allow the enhanced computing server 101 to run a series of computer-readable instructions related to receiving, storing, and analyzing data. Enhanced computing server 101 may be a Structured Query Language (SQL) server.

Enhanced computing server 101 typically includes a variety of computer-readable media. Computer-readable media may be any available media that may be accessed by enhanced computing server 101 and include both volatile and non-volatile media, removable and non-removable media. For example, computer-readable media may comprise a combination of computer storage media and communication media.

Computer storage media include volatile and non-volatile, removable and non-removable media implemented in any method or technology for storage of information such as computer-readable instructions, data structures, program modules, or other data. Computer storage media include, but are not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information that can be accessed by enhanced computing server 101.

Computing system environment 100 may also include optical scanners (not shown). Exemplary usages include scanning and converting paper documents, such as correspondence, data, and the like to digital files.

Although not shown, RAM 105 may include one or more applications representing the application data stored in RAM 105 while the enhanced computing server 101 is on and corresponding software applications (e.g., software tasks) are running on the enhanced computing server 101.

Communications module 109 may include a microphone, keypad, touch screen, and/or stylus through which a user of enhanced computing server 101 may provide input, and may also include one or more of a speaker for providing audio output and a video display device for providing textual, audiovisual and/or graphical output.

Software may be stored within memory 115 and/or storage to provide instructions to processor 103 for enabling enhanced computing server 101 to perform various functions. For example, memory 115 may store software used by the enhanced computing server 101, such as an operating system 117, application programs 119, and an associated database 121. In certain aspects, enhanced computing server 101 may comprise a plurality of databases 121. Also, some or all of the computer executable instructions for enhanced computing server 101 may be embodied in hardware or firmware.

Enhanced computing server 101 may operate in a networked environment supporting connections to one or more remote computing devices, such as computing devices 141 and 151. The computing devices 141 and 151 may be personal computing devices or servers that include many or all of the elements described above relative to the enhanced computing server 101.

The network connections depicted in FIG. 1 include a local area network (LAN) 125 and a wide area network (WAN) 129, but may also include other networks. When used in a LAN networking environment, enhanced computing server 101 may be connected to the LAN 125 through a network interface or adapter in the communications module 109. When used in a WAN networking environment, the enhanced computing server 101 may include a modem in the communications module 109 or other means for establishing communications over the WAN 129, such as the Internet 131 or other type of computer network. It will be appreciated that the network connections shown are illustrative and other means of establishing a communications link between the computing devices may be used. Various well-known protocols such as TCP/IP, Ethernet, FTP, HTTP and the like may be used, and the system may be operated in a client-server configuration to permit a user to retrieve web pages from a web-based server. Any of various conventional web browsers may be used to display and manipulate web pages.

Additionally, one or more application programs 119 used by the enhanced computing server 101, according to an illustrative embodiment, may include computer executable instructions for invoking functionality related to communication including, for example, email short message service (SMS), and voice input and speech recognition applications. In addition, the application programs 119 may include computer executable instructions for invoking user functionality related to access a centralized repository for performing various service tasks like routing, logging, and protocol bridging.

Embodiments of the disclosure may include forms of computer-readable media. Computer-readable media include any available media that can be accessed by an enhanced computing server 101. Computer-readable media may comprise storage media and communication media and in some examples may be non-transitory. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For instance, aspects of the method steps disclosed herein may be executed on a processor 103 on enhanced computing server 101. Such a processor may execute computer-executable instructions stored on a computer-readable medium.

Figure 2:
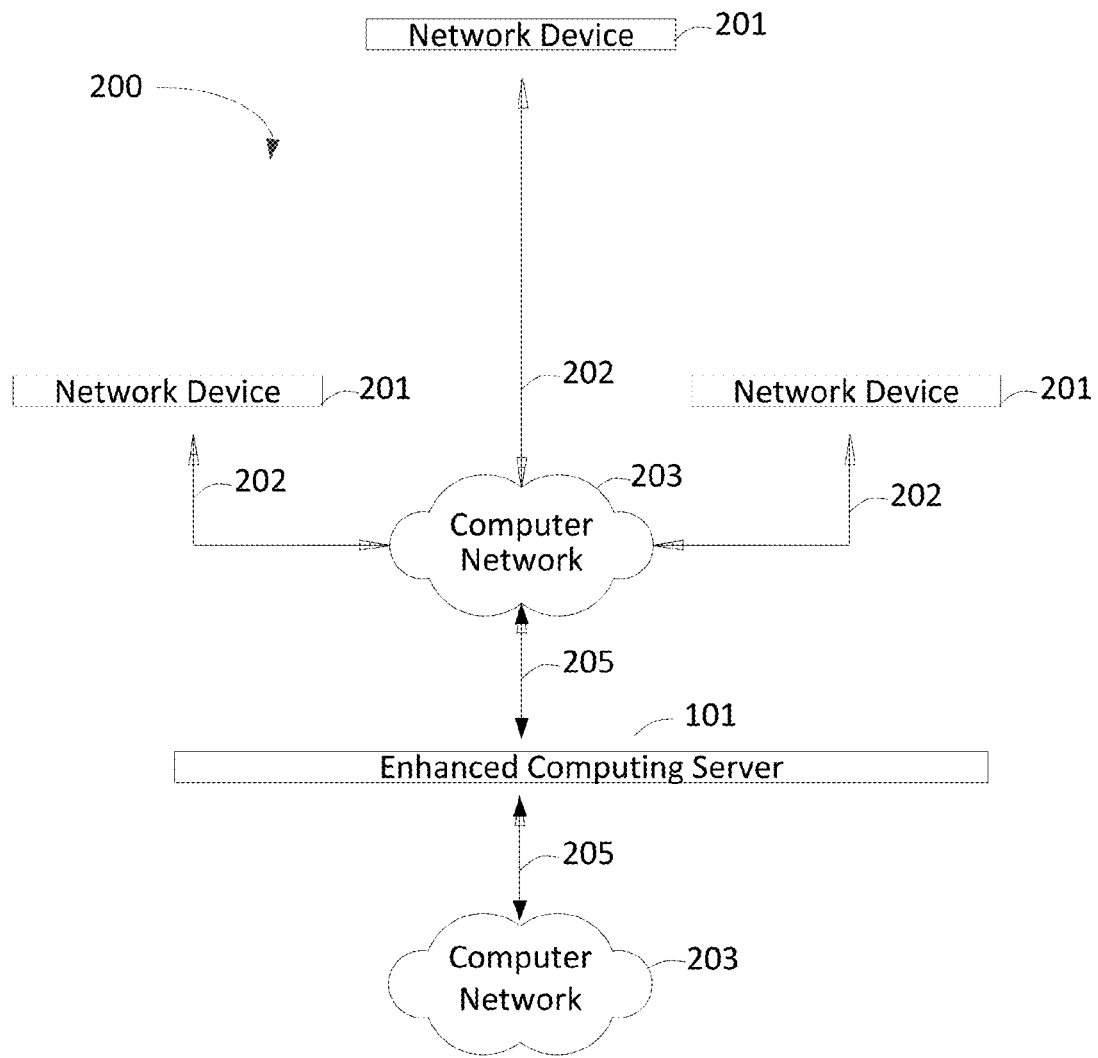
FIG. 2 shows an illustrative block diagram of network devices and server that may be used to implement the processes and function of one or more aspects of the present disclosure.

FIG. 2 illustrates another example operating environment in which various aspects of the disclosure may be implemented. As illustrated, system 200 may include one or more network devices 201. Network devices 201 may, in some examples, be connected by one or more communications links 202 to computer network 203 that may be linked via communications links 205 to server 204. In system 200, server 204 may be any suitable server, processor, computer, or data processing device, or combination of the same. Server 204 may be used to process the instructions received from, and the transactions entered into by, one or more participants.

According to one or more aspects, system 200 may be associated with a financial institution, such as a bank. Various elements may be located within the financial institution and/ or may be located remotely from the financial institution. For instance, one or more network devices 201 may be located within a branch office of a financial institution. Such network devices may be used, for example, by customer service representatives, other employees, and/or customers of the financial institution in conducting financial transactions via network 203. Additionally or alternatively, one or more network devices 201 may be located at a user location (e.g., a customer's home or office). Such network devices also may be used, for example, by customers of the financial institution in conducting financial transactions via computer network 203. In some aspects, network devices 201 a server such as enhanced computing server 101. Enhanced computing server 101 may be located at an entity such as a competitive analysis firm and network device 201 may be located at a financial institution.

Computer network 203 may be any suitable computer network including the Internet, an intranet, a wide-area network (WAN), a local-area network (LAN), a wireless network, a digital subscriber line (DSL) network, a frame relay network, and asynchronous transfer mode network, a virtual private network (VPN), or any combination of any of the same. Communications links 202 and 205 may be any communications links suitable for communicating between network devices 201 and server 204, such as network links, dial-up links, wireless links, hard-wired links, and/or the like.

Having described an example of a computing device that can be used in implementing various aspects of the disclosure and an operating environment in which various aspects of the disclosure can be implemented, several embodiments will now be discussed in greater detail.

In some aspects, a user, such as a production support team member for a financial institution, may log on to a computing device 141. The computing device 141 may be associated with the financial institution. In certain aspects, the financial institution may be capable of monitoring or receiving data from computing device 141 via enhanced computing server 101. Each user in the financial institution's computing system environment 100 may be assigned or provided a unique computer login name and login password. In some aspects, the user may be required to input the login name and login password in order to log on to a computing device 141 or computing device 151. For instance, after the computing device 141 is turned on or awoken from sleep mode, computing device 141 may display a prompt requesting the user to input a login name and login password. Thereafter, the user may be able to perform various tasks on computing device 141, including accessing, in some aspects, the financial institution's internal website.

An enterprise, such as the financial institution, may store data in one or more data warehouses. The enterprise may use one of many commercially available systems to transfer data from various locations of the enterprise to its data warehouse. As should be appreciated, the data warehouse may store extremely large amounts of data from the enterprise, where it may later be recalled and analyzed. In those circumstances, a user may need to be able to access the data in order to analyze the data and perform the necessary next steps. For example, a financial institution may employ various production support teams. Each production support team may be tasked with analyzing and maintaining a particular set of data stored within the data warehouse. For instance the production support team may be required to seed parameters, files and variables for an application; they may need to validate data for a particular production run or investigate the cause of a failed job; the production support team may need to obtain data from the data warehouse to provide management statistics and perform analyses in order to tune production workload.

In order to access the data warehouse, the production support team member may first be required to enter an ID name and password to ensure that the team member is an authorized user. As an example, a production support team member for a financial institution may receive a notification that there is an issue that requires action in the data warehouse. The notification may come in the form of a phone call, email, help desk ticket, and the like. For example, the production support team member may receive a help desk ticket regarding a failed job that may require the team member to access the data warehouse. The production support team member, having previously logged on to computing device 141, may then access the financial institution's internal website.

Figure 3:
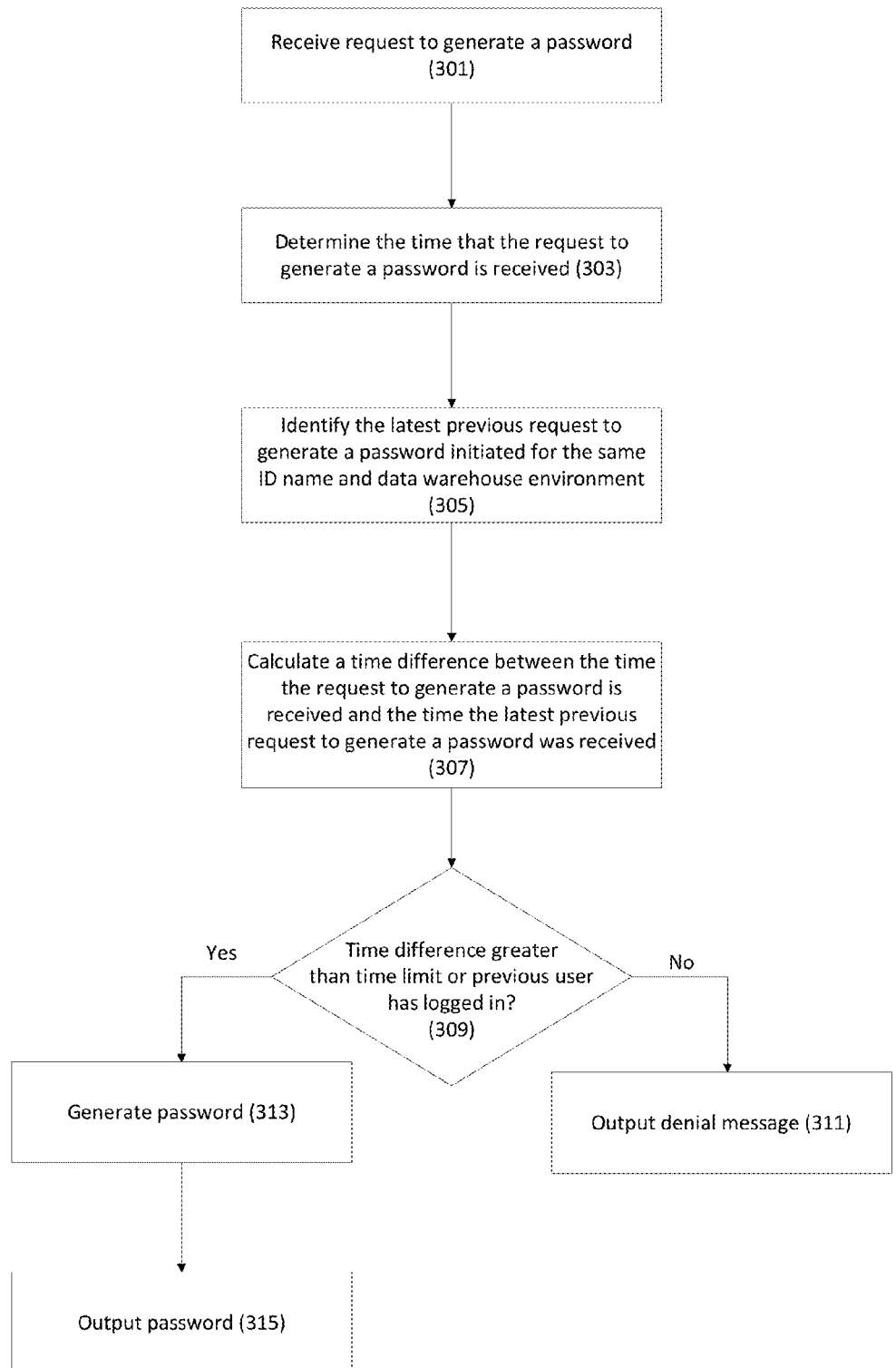
FIG. 3 shows an illustrative flow chart in accordance with aspects of the disclosure.

FIG. 3 illustrates an exemplary flow chart according to aspects of the disclosure. The flow chart shown in FIG. 3 illustrates an exemplary process for an enhanced computing server 101 to generate a password for display to a user. The user may utilize the password along with an ID name to access the data warehouse.

After the production support team member accesses the financial institution's internal website, enhanced computing server 101 may display an internal webpage to the user (in this example, the production support team member). The webpage displayed by enhanced computing server 101 may comprise on or more prompts, including a data warehouse environment, an ID name, and a reason for password reset prompt. Additionally, the webpage may also comprise a Get Password button. In certain aspects, the data warehouse environment prompt and ID name prompt may each comprise a dropdown menu that, when selected, may display one or more options for the user to select. The reason for password reset prompt may comprise a text box that enables a user to type in the reason the password is being reset.

At step 301, enhanced computing server 101 may receive a request to generate a password from the user. The user may submit a request to generate a password by responding to each of the prompts displayed at the internal webpage and by, then, selecting the Get Password button. The user may respond to the three prompts in any order, but, in some aspects, must respond to all three prompts prior to selecting the Get Password button in order for enhanced computing server 101 to receive the request to generate a password at step 301.

In certain aspects, when the user selects the dropdown menu of the data warehouse environment prompt, enhanced computing server 101 may display a list of the one or more data warehouse environments for the enterprise. The user may select the relevant data warehouse environment. Similarly, when the user selects the dropdown menu for the ID name prompt, enhanced computing server 101 may display a list of one or more ID names.

The ID names may be generic load ID names. A single ID name may be used across an entire support team or across multiple enterprise products. In some aspects, enhanced computing server 101 may only display ID names that the user is authorized to use for sign in. Enhanced computing server 101 may store a record of each user along with each ID name that the user is authorized to use for signing in to the data warehouse. The record may be input by a third party, such as a production support team manager, in order to maintain security at the data warehouse. For example, a financial institution may use various ID names for its various production support teams. A support team that only deals with deposits issues may have a ID name X and a support team that only deals with money laundering issues may have an ID name Y. Supposing user A only works with deposits, enhanced computing server 101 may store at memory 115 a record that indicates authorized ID names for user A as only including ID name X. Enhanced computing server 101 may then recognize user A when user A logs in to his computing device 141. So, when user A selects the dropdown menu for the data warehouse environment prompt, enhanced computing server 101 will only display an option for user A to select ID name X. Similarly, user B may be a support team member authorized to view information for both deposits and money laundering. Thus, when user B selects the dropdown menu for the data warehouse environment prompt, enhanced computing server 101 will display an option for user B to select ID name X or ID name Y.

The user may then input text at the reason for password reset prompt. The reason for password reset prompt may comprise a text field that enables a user to input text. The reason for password reset prompt may also comprise instructions displayed by the enhanced computing server 101 to instruct the user to input a reason why the password needs to be reset. The user may input text via a computing device 141. For example, the user may type in that he received a production ticket and needs to fix a certain job, or that he received a phone call from a manager requesting data warehouse management statistics, and the like.

After responding to all three of the prompts, the user may select the Get Password button, which may serve as a request to generate a password received at enhanced computing server 101 at step 301. In some aspects, enhanced computing server 101 may output an error message if the user selects the Get Password button prior to responding to one or more of the three prompts.

After enhanced computing server 101 receives a request to generate a password at step 301, enhanced computing server 101 may determine the time that the request to generate a password is received at step 303. Processor 103 may determine the time using an internal clock located at enhanced computing server 101. In certain aspects, the time that request is received may also be stored at memory 115. Thus, memory 115 may store a record of password generation requests for a plurality of users.

At step 305, enhanced computing server 101 may identify the latest previous request to generate a password initiated for the same ID name and data warehouse environment. For example, a user may transmit a request to generate a password for ID name X and data warehouse environment 1. Enhanced computing server 101 may receive this request at step 301 and determine that the request was sent at noon on a particular date at step 303. At step 305, processor 103 may review the records stored at memory 115 to determine the last time, prior to noon at the particular date, that enhanced computing server 101 received a request to generate a password for ID name X and data warehouse environment 1. In this example, processor 103 may identify that the latest previous request to generate a password initiated for the same ID name and data warehouse environment was received at 11:45 am on the particular date.

At step 307, processor 103 may calculate a time difference between the time the request to generate a password is received and the time the latest previous request to generate a password was received. In the example provided above, processor 103 may determine that the request is received at noon and the latest previous request was received at 11:45 am on the same date. Therefore, processor 103 would calculate, in this example, that the time difference is 15 minutes. In some aspects, the request received at step 301 may be the initial request received for a particular ID name and data warehouse environment. In such a case, enhanced computing server 101 may not identify a latest previous request at step 305. In that case, the process shown in FIG. 3 may skip ahead from step 303 to step 313.

At step 309, enhanced computing server 309 may compare the time difference calculated at step 307 with a time limit. The time limit may be a predetermined time limit that is inputted by a third party into enhanced computing server 101. In some aspects, the time limit is five minutes. Providing a time limit of five minutes may provide ample time for the user to input a generated password while remaining short enough such that the enhanced computing server 101 may continue to address other similar requests to generate a password.

Enhanced computing server 101 may also determine at step 309 whether a previous user has logged in using a generated password. In other words, enhanced computing server 101 may determine whether the user who initiated the latest previous request with the same ID name and data warehouse environment has logged in using a generated password. If so, the process may continue to step 313. If not, the process may continue to step 311. Thus, at step 309, may determine whether the time difference is greater than a time limit (such as five minutes) or if a previous user requesting a password for the same ID name and data warehouse environment has already logged in. If either of those conditions is met, enhanced computing server 101 may generate a password at step 313. If both of those conditions are not met, enhanced computing server 101 may output a denial message.

The denial message output at step 311 may provide a notification that a password cannot be generated for the ID name until the time limit expires. An exemplary denial message may be the following: "Short term password for this ID was already provided. You must wait for the 5 minutes expiration period to expire."

If either condition is met at step 309, enhanced computing server 101 may generate a password at step 313. The password may comprise alphanumeric characters. The password may be a short term ad hoc password that may be used to access the data warehouse environment. In certain aspects, the user must use the password to log into the data warehouse within the time limit. If the user does not log in with the password prior to the time limit, enhanced computing server 101 may expire the password. Enhanced computing server 101 may comprise at least one macro and stored procedures to generate the password. According to aspects of the disclosure, no passwords may be stored at enhanced computing server 101. Rather, each password may be randomly generated and may only be available for the time limit or until log in without requiring the user to return to step 301. Moreover, a particular password may only be used to log in at one computing device for one ID name. Therefore, dissemination of a password may not enable other users to log into the data warehouse.

At step 315, enhanced computing server 101 may output the short term password generated at step 313. The password may be displayed at a webpage of the enterprise's internal website.

Enhanced computing server 101 may, after outputting the password at step 315, check to determine if any new request for a password was initiated for the same ID name and data warehouse environment. Processor 103 may perform this determination a certain time equal to the time limit after outputting the password. For example, if the time limit is set at five minutes, processor 103 may determine whether any new request for the same ID name and data warehouse environment was received five or more minutes after outputting the password. If not, enhanced computing server 101 may expire the password.

Enhanced computing server 101 may record and store at memory 115 the activities performed by the user at the data warehouse. Enhanced computing server 101 may also maintain records of requests for password generation. Each of these records and activities may be stored at memory 115 and gathered by processor 103 to produce audit reports.

The foregoing descriptions of the disclosure have been presented for purposes of illustration and description. They are not exhaustive and do not limit the disclosure to the precise form disclosed. Modifications and variations are possible in light of the above teachings or may be acquired from practicing of the disclosure. For example, the described implementation includes software by the present disclosure may be implemented as a combination of hardware and software or in hardware alone. Additionally, although aspects of the present disclosure are described as being stored in memory, one skilled in the art will appreciate that these aspects can also be stored on other types of computer-readable media, such as secondary storage devices, like hard disks, floppy disks, or CD-ROM.

What is claimed is:

1. A method, comprising:
   receiving, at a processor, a request to generate a single use short term password, wherein the request comprises prompts for entry of a data warehouse environment, an ID name, and a text box for typing a reason for password reset;
   determining, at the processor, the time that the request to generate the single use short term password is received at the processor;
   identifying, at the processor, the latest previous request to generate a single use short term password initiated for the same ID name and the data warehouse environment, wherein the identifying comprises determining the time that the latest previous request was received at the processor;
   calculating, at the processor, a time difference between the time the request to generate the single use short term password is received at the processor and the time the latest previous request to generate the single use short term password was received at the processor,
   determining whether a previous user who initiated the latest previous request with the same ID name and data warehouse environment has logged on using the single use short term generated password;
   comparing, at the processor, the time difference with a short term time limit;
   outputting, by the processor, a denial message if the previous user who initiated the latest previous request with the same ID name and data warehouse environment has not logged on with a previously generated single use short term password generated by the latest previous request or the time difference is less than the short term time limit
   randomly generating, by the processor, a single use short term password when the time difference is greater than the short term time limit or the previous user who initiated the latest previous request to generate a single use short term password has logged in using the single use short term password generated from the latest previous request; and
   outputting, at the processor, the single use short term password after randomly generating the short term password.

2. The method of claim 1, wherein the time limit is a predetermined short term time limit.

3. The method of claim 1, wherein the short term time limit is five minutes.

4. The method of claim 1, further comprising expiring, at the processor, the single use short term password when no new request to generate a single use short time password was initiated for the ID name and data warehouse environment a certain time after the password was output, wherein the certain time is equal to the short term time limit.

5. The method of claim 1, wherein the generated single use short term password enables access to a data warehouse.

6. The method of claim 1, wherein the denial message provides a notification that a single use short term password cannot be generated for the ID name until the short term time limit expires.

7. The method of claim 1, wherein the single use short term password comprises alphanumeric characters.

8. A non-transitory computer-readable storage medium having computer-executable program instructions stored thereon that, when executed by a processor, cause the processor to:
   receive a request to generate a single use short term password, wherein the request comprises prompts for entry of a data warehouse environment, an ID name, and a text box for typing a reason for the single use short term password reset;
   determine the time that the request to generate the single use short term password is received at the processor;
   identify the latest previous request to generate a short term single use password initiated for the same ID name and the data warehouse environment, wherein the identifying comprises determining the time that the latest previous request was received at the processor;
   calculate a time difference between the time the request to generate the single use short term password is received at the processor and the time the latest previous request to generate the short term single use password was received at the processor;
   determine whether a previous user who initiated the latest previous request with the same ID name and data warehouse environment has logged on using the single use short term generated password;
   compare the time difference with a short term time limit;

output, by the processor, a denial message if the previous user who initiated the latest previous request with the same ID name and data warehouse environment has not logged on with a previously generated single use short term password generated by the latest previous request or the time difference is less than the short term time limit;

randomly generate a single use short term password when the time difference is greater than the time limit or the previous user who initiated the latest previous request to generate a single use short term password has logged in using the single use short term password generated from the latest previous request; and output the single use short term password after randomly generating the single use short term password.

9. The non-transitory computer-readable storage medium of claim 8, wherein the short term time limit is a predetermined time limit.

10. The transitory computer-readable storage medium of claim 8, wherein the short term time limit is five minutes.

11. The transitory computer-readable storage medium of claim 8, wherein the computer-executable program instructions further cause the processor to expire the single use short term password when no new request to generate a single use short term password was initiated for the ID name and data warehouse environment a certain time after the single use short term password was output, wherein the certain time is equal to the short term time limit.

12. The transitory computer-readable storage medium of claim 8, wherein the generated single use short password enables access to a data warehouse.

13. The transitory computer-readable storage medium of claim 8, wherein the denial message provides a notification that a single use short term password cannot be generated for the ID name until the short term time limit expires.

14. An apparatus comprising:

a memory;

a processor, wherein the processor executes computer-executable program instructions which cause the processor to:

receive a request to generate a single use short term password, wherein the request comprises prompts for entry of a data warehouse environment, an ID name, and a text box for typing a reason for the single use short term password reset;

determine the time that the request to generate the single use short term password is received at the processor;

identify the latest previous request to generate a single use short term password initiated for the same ID name and the data warehouse environment, wherein the identifying comprises determining the time that the latest previous request was received at the processor;

calculate a time difference between the time the request to generate the single use short term password is received at the processor and the time the latest previous request to generate the short term single use password was received at the processor;

determine whether a previous user who initiated the latest previous request with the same ID name and data warehouse environment has logged on using the single use short term generated password compare the time difference with a time limit;

output, by the processor, a denial message if the previous user who initiated the latest previous request with the same ID name and data warehouse environment has not logged on with a previously generated single use short term password generated by the latest previous request or the time difference is less than the short term time limit;

randomly generate the single use short term password when the time difference is greater than the time limit or the previous user who initiated the latest previous request to generate a single use short term password has logged on using the single use short term password generated from the latest previous request; and output the single use short term password after randomly generating the short term single use password.

15. The apparatus of claim 14, wherein the short term time limit is a predetermined time limit.

16. The apparatus of claim 14, wherein the short term time limit is five minutes.

17. The apparatus of claim 14, wherein the denial message provides a notification that a single use short term password cannot be generated for the ID name until the time limit expires.

18. The apparatus of claim 14, wherein the computer-executable program instructions further cause the processor to expire the single use short term password when no new request to generate a single use short term password was initiated for the ID name and data warehouse environment a certain time after the single use short term password was output, wherein the certain time is equal to the short term time limit.

19. The apparatus of claim 14, wherein the single use short term generated password enables access to a data warehouse data warehouse.

20. The apparatus of claim 14, wherein the short term single use password comprises alphanumeric characters.

* * * * *